(12) United States Patent
Lin et al.

(10) Patent No.: US 10,456,881 B1
(45) Date of Patent: Oct. 29, 2019

(54) MACHINE TOOL

(71) Applicant: INDUSTRIAL TECHNOLOGY RESEARCH INSTITUTE, Hsinchu (TW)

(72) Inventors: Wei Chen Lin, New Taipei (TW); Jen Ji Wang, Taichung (TW); Hsiao Chen Ho, Taichung (TW); Wei Chu Lin, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/260,223

(22) Filed: Jan. 29, 2019

(30) Foreign Application Priority Data

Nov. 22, 2018 (TW) .............................. 107141641 A

(51) Int. Cl.
*F16C 29/02* (2006.01)
*B23Q 1/38* (2006.01)
*B23Q 1/01* (2006.01)

(52) U.S. Cl.
CPC .............. *B23Q 1/38* (2013.01); *B23Q 1/017* (2013.01); *F16C 29/025* (2013.01); *F16C 2322/39* (2013.01)

(58) Field of Classification Search
CPC ...... F16C 29/025; F16C 2322/39; B23Q 1/38; B23Q 1/017
See application file for complete search history.

(56) References Cited

U.S. PATENT DOCUMENTS

| 2,635,930 | A | * | 4/1953 | Daugherty | ............... B23Q 1/38 384/9 |
| 3,499,690 | A | * | 3/1970 | Siebers | .................... B23Q 1/38 384/12 |
| 4,545,271 | A | * | 10/1985 | Romi | ........................ B23B 3/06 82/149 |
| 6,150,740 | A | * | 11/2000 | Slocum | ................... F16O 29/00 310/12.09 |

(Continued)

FOREIGN PATENT DOCUMENTS

| CN | 2774702 Y | 4/2006 |
| CN | 102092004 A | 6/2011 |

(Continued)

OTHER PUBLICATIONS

Taiwan Office Action, "Office Action", dated Jun. 11, 2019, Taiwan.

*Primary Examiner* — Thomas R Hannon
(74) *Attorney, Agent, or Firm* — Tim Tingkang Xia, Esq.; Locke Lord LLP

(57) ABSTRACT

The disclosure relates to a machine tool. The machine tool includes machine base, guide rails, and movable main structure. The movable main structure is slidably disposed on the machine base via the guide rails, and each guide rail has bearing surfaces. The machine tool has X-axis, Y-axis, and Z-axis, the Z-axis is substantially parallel to an axis of a chuck of the machine tool, and the Y-axis is substantially parallel to a sliding direction of the movable main structure. The machine tool characterized in that: normal directions of the bearing surfaces of the guide rails are not parallel to the X-axis, the Y-axis, the Z-axis of the machine tool and a reference line that passes through the guide rails.

10 Claims, 6 Drawing Sheets

(56) References Cited

U.S. PATENT DOCUMENTS

| | | | |
|---|---|---|---|
| 7,573,161 B2 | 8/2009 | Aeschlimann et al. | |
| 2004/0082281 A1* | 4/2004 | Kawahara | B23Q 1/38 451/119 |

FOREIGN PATENT DOCUMENTS

| | | |
|---|---|---|
| CN | 103406765 A | 11/2013 |
| CN | 103692223 A | 4/2014 |
| CN | 104148952 A | 11/2014 |
| CN | 103331610 B | 12/2015 |
| CN | 205559991 U | 9/2016 |
| CN | 103692348 B | 11/2016 |
| CN | 106181770 A | 12/2016 |
| CN | 108453518 A | 8/2018 |
| CN | 207900651 U | 9/2018 |
| DE | 10061934 A1 | 6/2002 |
| TW | M274186 U | 9/2005 |
| TW | M411308 U | 9/2011 |
| TW | M466745 U | 12/2013 |
| TW | 201625857 A | 7/2016 |

\* cited by examiner

MACHINE TOOL

CROSS-REFERENCE TO RELATED APPLICATIONS

This non-provisional application claims priority under 35 U.S.C. § 119(a) on Patent Application No(s). 107141641 filed in Taiwan, R.O.C. on Nov. 22, 2018, the entire contents of which are hereby incorporated by reference.

TECHNICAL FIELD

The disclosure relates to a machine tool, a machine tool having hydrostatic guide rail.

BACKGROUND

A machine tool is a machine that can hold a cutting tool to shape or machine a workpiece made of metal or other rigid materials. The tool may be detachably mounted on a spindle nose of a movable assembly via a specialized type of clamp (e.g., the chuck). The movable assembly is slidably disposed on the base of the machine tool via a guiding mechanism, such that the tool is able to be moved with respect to the workpiece to shape or machine the workpiece.

In order to effectively reduce the friction during the movement of the guiding mechanism, hydrostatic bearing is indispensable. The hydrostatic pressure is produced by creating an oil film between the movable assembly and the base of the machine tool, which may cause the movable assembly to tilt relative to the base while the tool is contacting the workpiece. This issue would negatively affect the dynamic performance of the tool. However, the hydrostatic oil pockets on the conventional machine tool are arranged along the axis of the basic coordinate system. Therefore, only the oil pockets on a single axis are able to provide rigidity to resist the tilting of the movable assembly. With the increase of the demand for high dynamic performance, the conventional guiding mechanism is unable to meet the demand.

SUMMARY

Accordingly, the present disclosure provides a machine tool that is capable of effectively reducing the unnecessary deformation or movement of its movable assembly during operation.

One embodiment of the disclosure provides a machine tool. The machine tool includes a machine base, two guide rails, and a movable main structure. The movable main structure is slidably disposed on the machine base via the two guide rails, each of the two guide rails has a plurality of bearing surfaces facing and configured to guide the movable main structure. The machine tool has an X-axis, a Y-axis and a Z-axis perpendicular to one another, the Z-axis is substantially parallel to an axis of a chuck of the machine tool, and the Y-axis is substantially parallel to a sliding direction of the movable main structure with respect to the machine base. Normal directions of the plurality of bearing surfaces of the two guide rails are not parallel to the X-axis, the Y-axis, the Z-axis of the machine tool, and a reference line that passes through the two guide rails.

According to the machine tool as discussed above, since the normal directions of the bearing surfaces of the guide rails are not parallel to the X-axis, Y-axis, and Z-axis of the machine tool, and the reference line that passes through the guide rails, that is, the hydrostatic force is not only exerted along one axis but has components along the X-axis, Y-axis, and Z-axis of the machine tool, which helps to improve the rigidity in, for example, the X-axis to avoid or eliminate the problem, that the movable main structure may be twisted during the operation, thereby improving the machining precision.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
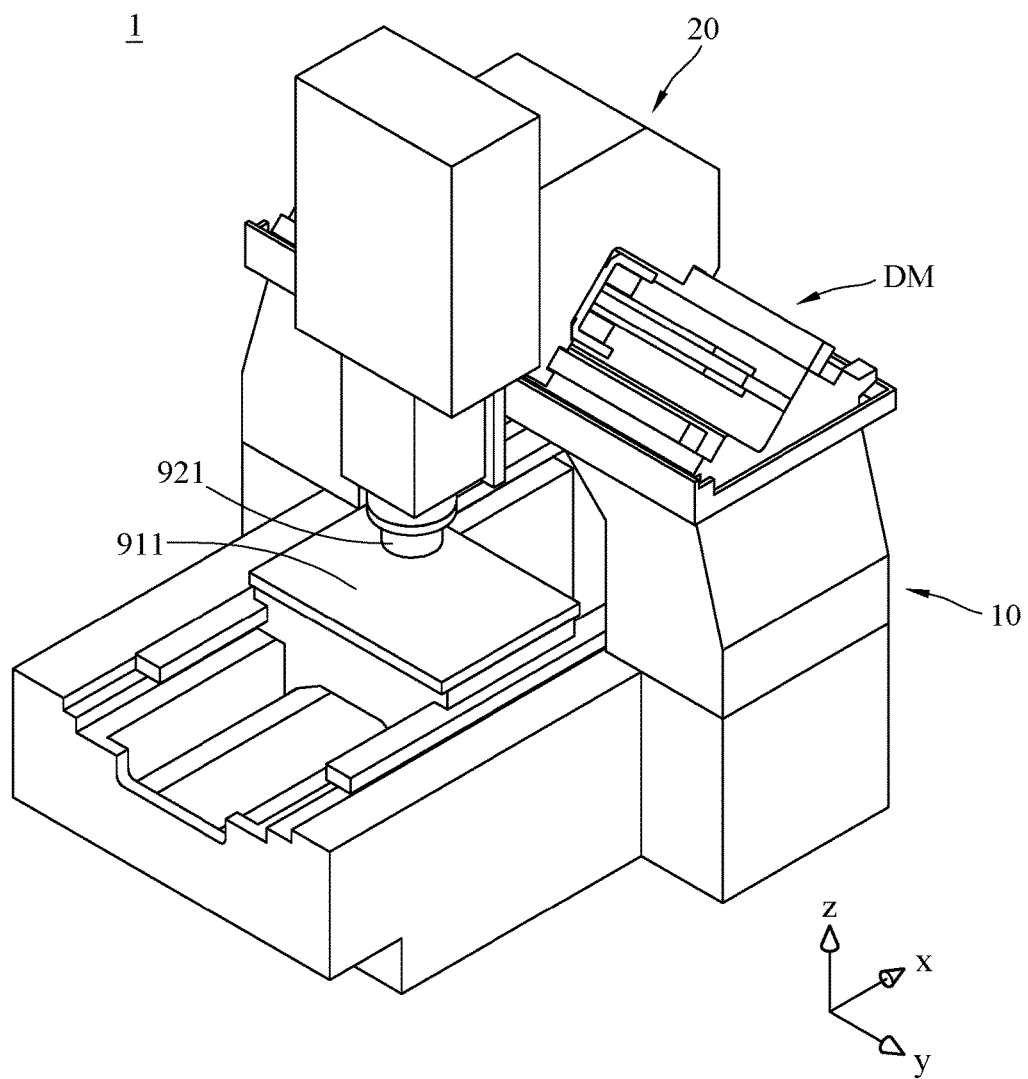
FIG. 1 is a perspective view of a machine tool according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained unless the terms have a specific meaning in the present disclosure. Furthermore, in order to simplify the drawings, some conventional structures and components are drawn in a simplified manner to keep the drawings clean.

Further, the following embodiments are disclosed by the figures, and some practical details are described in the following paragraphs, but the present disclosure is not limited thereto. Furthermore, for the purpose of illustration, some of the structures and components in the figures are simplified, and wires, lines or buses are omitted in some of the figures. And the size, ratio, and angle of the components in the drawings of the present disclosure may be exaggerated for illustrative purposes, but the present disclosure is not limited thereto, and various modifications are allowed and can be made according to the following disclosure as long as it does not depart from the spirit of the present disclosure. Note that the actual size and designs of the product manufactured based on the present disclosure may also be modified according to any actual requirements.

Further, the terms, such as "end", "portion", "part", "area" and the like may be used in the following to describe specific components and structures or specific features thereon or therebetween, but are not intended to limit these components and structures. In the following, it may use terms, such as "substantially", "approximately" or "about"; when these terms are used in combination with size, concentration, temperature or other physical or chemical properties or characteristics, they are used to express that, the deviation existing in the upper and/or lower limits of the range of these properties or characteristics or the acceptable tolerances caused by the manufacturing tolerances or analysis process, would still able to achieve the desired effect.

Furthermore, unless otherwise defined, all the terms used in the disclosure, including technical and scientific terms, have their ordinary meanings that can be understood by those skilled in the art. Moreover, the definitions of the above terms are to be interpreted as being consistent with the technical fields related to the disclosure. Unless specifically defined, these terms are not to be construed as too idealistic or formal meanings. The terms of the components in the disclosure are sometimes referred to in a more concise manner, depending on the requirements of the description, and should be understood by the reader.

Figure 2:
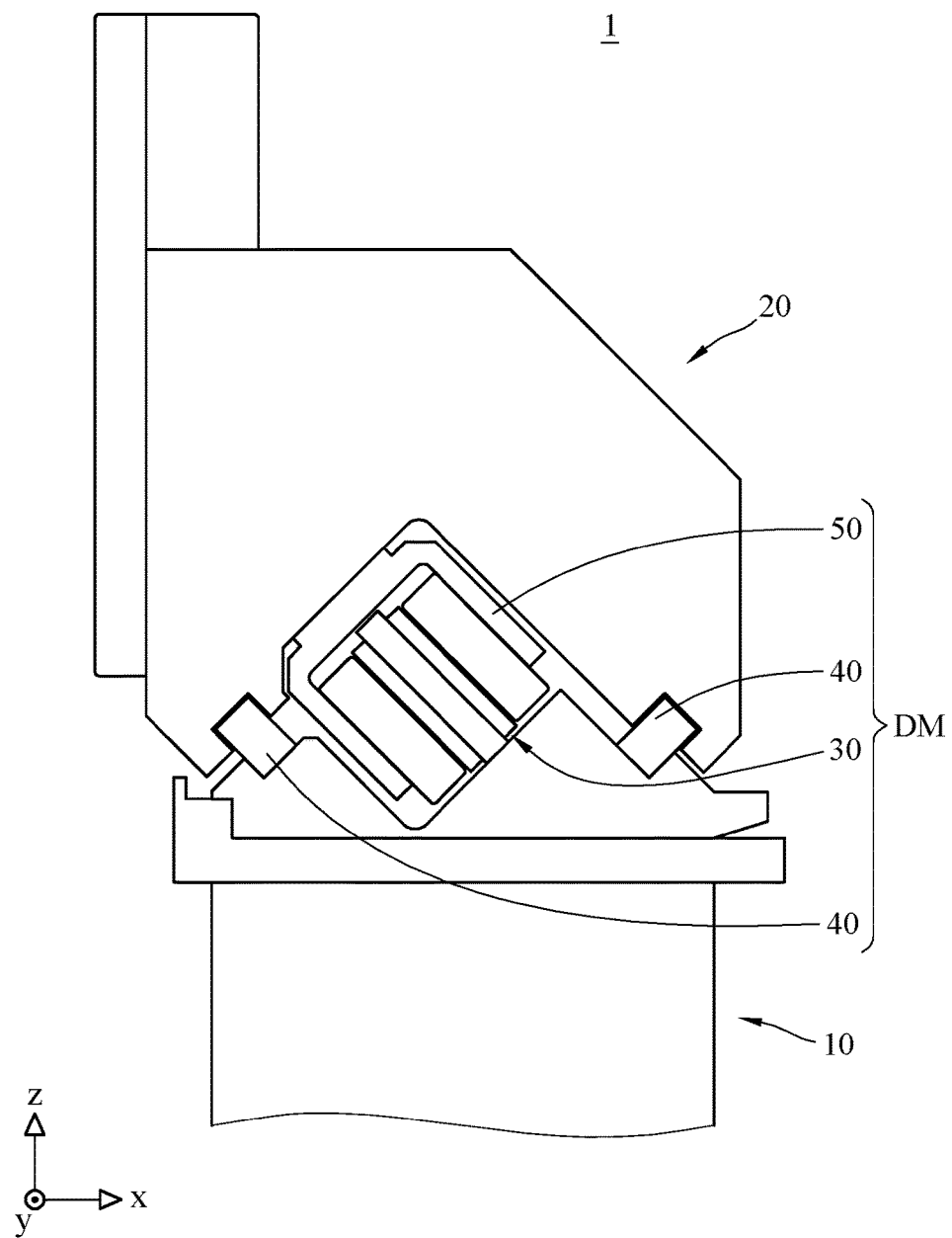
FIG. 2 is a partial enlarged side view of the machine tool in FIG. 1.
Figure 3:
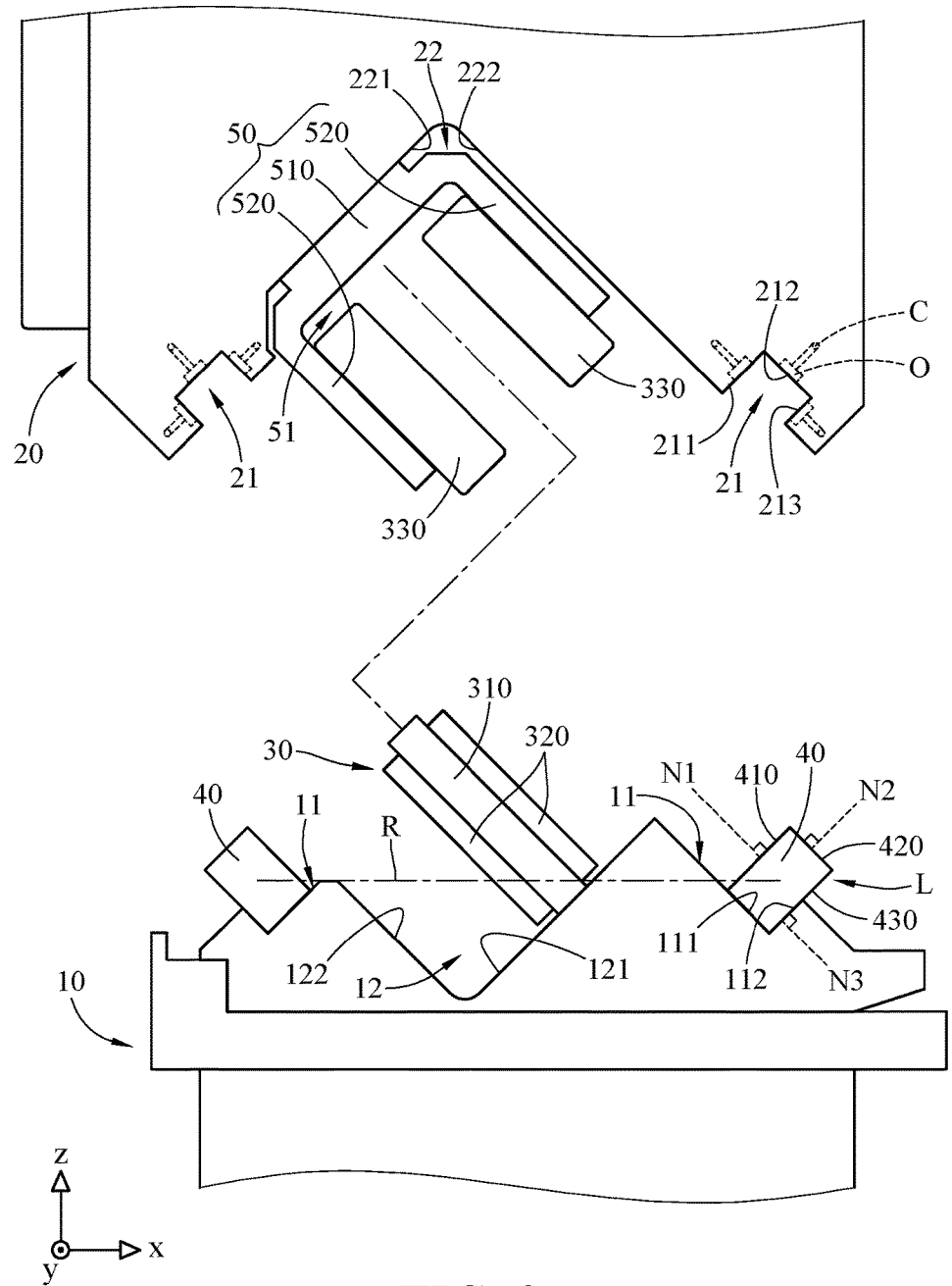
FIG. 3 is an enlarged exploded view of the machine tool in FIG. 2.

Firstly, please refer to FIGS. 1-3, FIG. 1 is a perspective view of a machine tool according to one embodiment of the disclosure, FIG. 2 is a partial enlarged side view of the machine tool in FIG. 1, and FIG. 3 is an enlarged exploded view of the machine tool in FIG. 2. Note that the tool, screws, wires, cables and other structural features of the machine tool 1 are omitted from the drawings for the purpose of illustration. This embodiment provides a machine tool 1. The machine tool 1 may be but is not limited to, a vertical three-axis hydrostatic guide rail linear motor milling machine. As shown in the figures, the machine tool 1 includes a machine base 10, a movable main structure 20, and a driving assembly DM. The movable main structure 20 is slidably disposed on machine base 10 via the driving assembly DM, such that a chuck (or the spindle nose) 921 of the movable main structure 20 is allowed to be moved with respect to a workpiece platform 911 on the machine base 10.

In addition, in this embodiment, the machine tool 1 has a predetermined X-axis, Y-axis, and Z-axis that are taken as standard directions for the orientations and movements of the components discussed in the following paragraphs. In this embodiment, the Z-axis is substantially parallel to an axis of the chuck 921 of the machine tool 1 (i.e., the rotary axis of the spindle nose), the Y-axis is substantially parallel to a sliding direction of the movable main structure 20 with respect to the machine base 10, and the X-axis is perpendicular to both the Y-axis, and Z-axis, but the disclosure is not limited thereto; in some other embodiments, the Y-axis and X-axis may be switched. In this embodiment, the coordinate system consisted of the aforementioned X-axis, Y-axis, and Z-axis are determined by Cartesian coordinate system and were predetermined during the manufacture of the machine tool 1, and this system can be used to locate the workpiece and tool and the components of the machine tool 1. Therefore, the said coordinate system can also be called a basic coordinate system of the machine tool (or a machine tool coordinate system). That is, the aforementioned X-axis, Y-axis, and Z-axis are the basic axes of the machine tool 1.

Further, as shown in FIG. 3, the machine base 10 has two guide rail installation recesses 11 and a lower motor installation recess 12 located between the two guide rail installation recesses 11. The guide rail installation recesses 11 and the lower motor installation recess 12 are all located on a side of the machine base 10 facing the movable main structure 20. As shown in the figures, the guide rail installation recesses 11 and the lower motor installation recess 12 are all V-shaped grooves. The said V-shaped groove is a space formed by two inclined surfaces, and the angle between these two inclined surfaces may be, but not limited to, an acute angle, right angle or obtuse angle, and the connection of these two inclined surfaces may be, but not limited to, a continuous curved surface.

In detail, the guide rail installation recess 11 is tapered toward the negative Z-axis, and the guide rail installation recess 11 is formed by a first mount surface 111 and a second mount surface 112. An angle (not numbered) between the first mount surface 111 and the second mount surface 112 may be, but not limited to, an acute angle, right angle or obtuse angle, and the connection of the first mount surface 111 and the second mount surface 112 may be, but not limited to, a continuous curved surface. In addition, normal directions (not shown) of the first mount surface 111 and the second mount surface 112 are not parallel to the X-axis, Y-axis, and Z-axis. In geometry, a normal direction may also be called normal line, is an object such as a line or vector that is perpendicular to a given object. The lower motor installation recess 12 is also tapered toward the negative Z-axis, and the lower motor installation recess 12 is formed by a first inclined surface 121 and a second inclined surface 122. An angle (not numbered) between the first inclined surface 121 and the second inclined surface 122 may be, but not limited to, an acute angle, right angle or obtuse angle, and the connection of the first inclined surface 121 and the second inclined surface 122 may be, but not limited to, a continuous curved surface. In addition, normal directions (not shown) of the first inclined surface 121 and the second inclined surface 122 are not parallel to the X-axis, Y-axis, and Z-axis.

The movable main structure 20 has two guide rail accommodation chambers 21 and an upper motor installation recess 22 located between the two guide rail accommodation chambers 21. The guide rail accommodation chambers 21 and the upper motor installation recess 22 are all located on a side of the movable main structure 20 facing the machine base 10, and they respectively correspond to the guide rail installation recesses 11 and the lower motor installation recess 12 of the machine base 10. As shown in the figures, the guide rail accommodation chambers 21 are quadrilateral grooves, and the upper motor installation recess 22 is an inverted V-shaped groove.

In detail, the guide rail accommodation chamber 21 is formed by a first inner end surface 211, a second inner end surface 212, and a third inner end surface 213, wherein the second inner end surface 212 is connected to and located between the first inner end surface 211 and third inner end surface 213, and the second inner end surface 212 is substantially perpendicular to both the first inner end surface 211 and third inner end surface 213, but the disclosure is not limited thereto. In addition, normal directions (not shown) of the first inner end surface 211, second inner end surface 212 and third inner end surface 213 are not parallel to the X-axis, Y-axis, and Z-axis. The upper motor installation recess 22 is tapered toward the positive Z-axis, and the upper motor installation recess 22 is formed by a first inclined surface 221 and a second inclined surface 222. An angle (not numbered) between the first inclined surface 221 and the second inclined surface 222 may be, but not limited to, an acute angle, right angle or obtuse angle, and the connection of the first inclined surface 221 and the second inclined surface 222 may be, but not limited to, a continuous curved surface. In addition, normal directions (not shown) of the first inclined surface 221 and the second inclined surface 222 are not parallel to the X-axis, Y-axis, and Z-axis.

In more detail, in this or some other embodiments, the movable main structure 20 further has a plurality of oil pockets O and a plurality of oil channels C respectively connected to these oil pockets O. The oil pockets O are respectively disposed at the first inner end surfaces 211, second inner end surfaces 212 and third inner end surfaces 213 of the guide rail accommodation chambers 21. The oil channels C are connected to an oil or lubricating fluid supply (not shown), such that the oil or lubricating fluid can be distributed to the guide rail accommodation chambers 21 through the oil channels C and the oil pockets O. Note that the disclosure is not limited by the type of the oil or lubricating fluid, and the sizes and arrangements of the oil pipes and oil pockets O.

In this embodiment, the machine tool 1 further includes a connecting structure 50. The connecting structure 50 includes a fixed portion 510 and two arm portions 520. The fixed portion 510 is fixed on the first inclined surface 221 or second inclined surface 222 of the upper motor installation recess 22 of the movable main structure 20, but the disclosure is not limited thereto. The arm portions 520 are respectively connected to two opposite ends of the fixed portion 510, and the arm portions 520 and the fixed portion 510 together form an accommodation space 51 therebetween. The arm portions 520 are spaced apart from both the movable main structure 20 and the machine base 10. Therefore, when a certain amount of force is applied on the arm portion 520, the arm portion 520 may be moved with respect to the fixed portion 510, movable main structure 20 and machine base 10.

Further, in this embodiment, the driving assembly DM includes a reference linear motor 30 and two guide rails 40.

The linear motor 30 is partially accommodated in the accommodation space 51 of the connecting structure 50. In detail, the linear motor 30 includes a stator holder 310, two stators 320 and two movers 330. The stator holder 310 is fixed on the first inclined surface 121 or the second inclined surface 122 of the lower motor installation recess 12 of the machine base 10, but the disclosure is not limited thereto. The stators 320 are respectively fixed at two opposite sides of the stator holder 310, such that the stators 320 are fixed on the machine base 10 via the stator holder 310. The movers 330 are respectively fixed at the inner sides of the arm portions 520 of the connecting structure 50, such that the stators 320 are maintained in a state of being located between and spaced apart from the movers 330.

Figure 4:
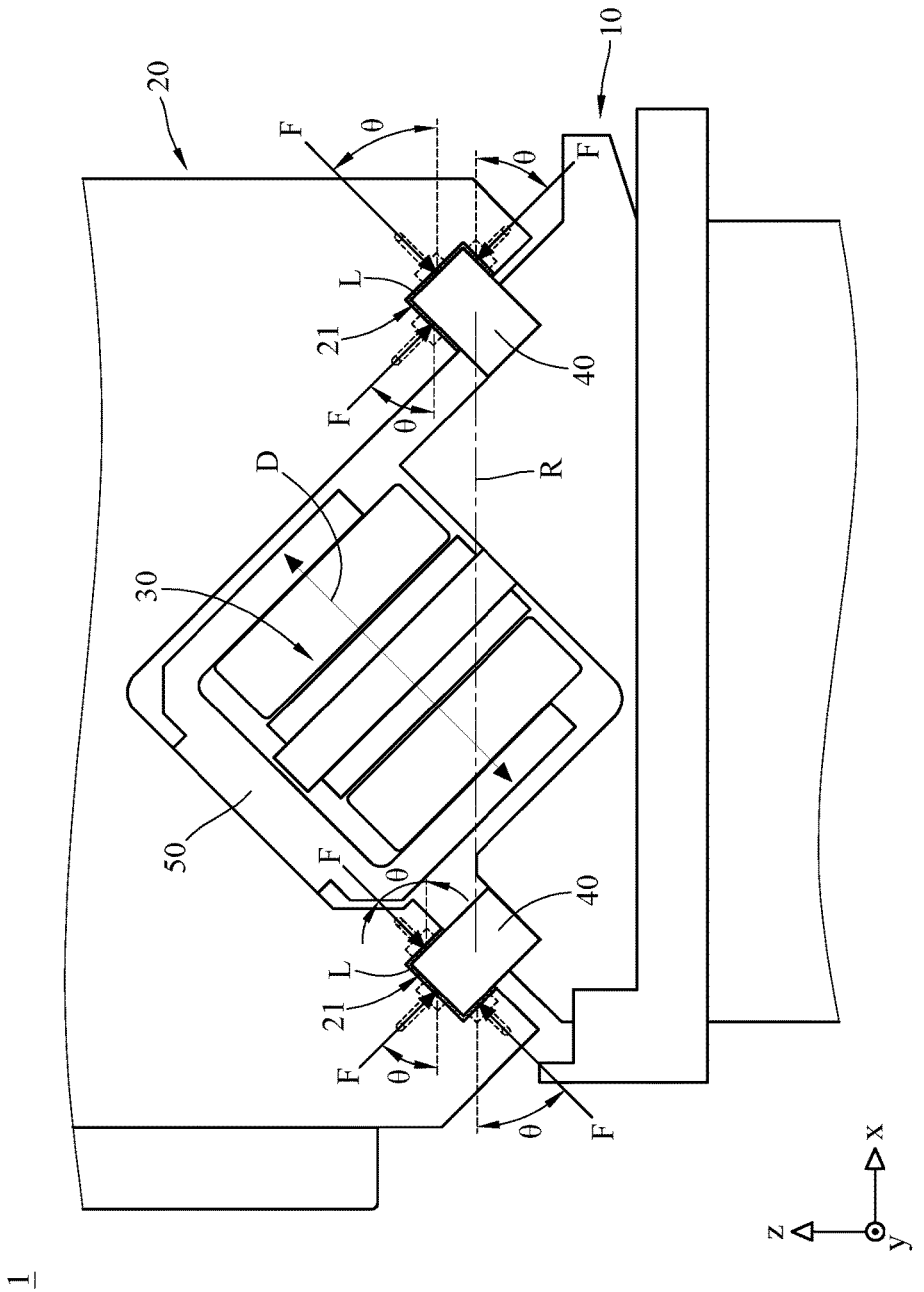
FIG. 4 is an enlarged view of FIG. 2 when the machine tool is in operation and applies hydrostatic pressure on the guide rails.

In this embodiment, the linear motor 30 is placed in an inclined manner compared with the basic coordinate system of the machine tool 1 (i.e., the coordinate system consisted of the X-axis, Y-axis, and Z-axis). In detail, in the linear motor 30, the movers 330, the stators 320, and the stator holder 310 are arranged along an arrangement direction D (as shown in FIG. 4), and the arrangement direction D is not parallel to the X-axis, Y-axis, and Z-axis. Similarly, in another embodiment that the stator holder 310 is fixed to the second inclined surface 122 of the machine base 10, the linear motor 30 is also placed in an inclined manner, and its arrangement direction is not parallel to the X-axis, Y-axis, and Z-axis, either.

When the linear motor 30 is in operation, the movers 330 and the stators 320 may have a magnetic attraction force therebetween so that the movers 330 may be attracted by and moved closer to the stators 320. However, the movements of the movers 330 will only cause the arm portions 520 to move but not undesirably affect the movable main structure 20 since the movers 330 are fixed on the arm portions 520. As a result, the problem, that the movable main structure 20 is deformed due to the operation of the linear motor 30, can be prevented. This helps to maintain the precision of the tool movement; that is, helps to improve the machining precision. In short, due to the connecting structure 50, the unnecessary deformation or disturbances on the movable main structure 20 caused by the operation of the linear motor 30 can be largely reduced.

Note that the connecting structure 50 may be optional. In some other embodiments, the driving assembly may not have the connecting structure 50; in such a case, the movers may be directly fixed on the movable main structure.

The guide rails 40 are fixed on the machine base 10. In detail, the guide rails 40 are respectively disposed in the guide rail installation recesses 11 of the machine base 10 so that the guide rails 40 are respectively located at two opposite sides of the linear motor 30. As shown in the figures, in this embodiment, the guide rails 40 and linear motor 30 are substantially arranged along the X-axis. Take one of the guide rails 40 as an example, in this embodiment, the guide rail 40 is fixed to the first mount surface 111 and the second mount surface 112 of the machine base 10 so that the guide rail 40 is accommodated in the guide rail installation recess 11. The guide rail 40 may be, but not limited to, fixed to the first mount surface 111 and second mount surface 112 by screwing, but the disclosure is not limited thereto.

The adjacent three sides of the guide rail 40, that respectively face different surfaces of the movable main structure 20, respectively has a first bearing surface 410, a second bearing surface 420, and a third bearing surface 430. The first bearing surface 410, second bearing surface 420, and third bearing surface 430 respectively correspond to the first inner end surface 211, second inner end surface 212 and third inner end surface 213 of the guide rail accommodation chamber 21 of the movable main structure 20. In this embodiment, the guide rail 40 is also placed in an inclined manner compared with the basic coordinate system (i.e., the coordinate system consisted by the aforementioned X-axis, Y-axis, and Z-axis) of the machine tool 1. In detail, the first bearing surface 410 has a normal direction N1, the second bearing surface 420 has a normal direction N2, the third bearing surface 430 has a normal direction N3, and the normal directions N1-N3 are all not parallel to the X-axis, Y-axis, and Z-axis. In addition, the normal directions N1-N3 are substantially respectively perpendicular to the first inner end surface 211, second inner end surface 212, and third inner end surface 213 of the guide rail accommodation chamber 21.

As such, when the oil is fed into the guide rail accommodation chambers 21 from the oil pockets O, it will form bearing oil films L between the first bearing surface 410, second bearing surface 420, and third bearing surface 430 of the guide rails 40 and the first inner end surface 211, second inner end surface 212 and third inner end surface 213 of the guide rail accommodation chambers 21 (as shown in FIG. 4) so as to provide hydrostatic pressure onto the guide rails 40 along the normal directions N1-N3 of the first bearing surfaces 410, second bearing surfaces 420 and third bearing surfaces 430 of the guide rails 40 (as the force F shown in FIG. 4), thereby increasing the gaps between the guide rails 40 and the movable main structure 20. Therefore, in comparison with the conventional guide rail that does not provide hydrostatic pressure, the machine tool of the present disclosure has various improvements, such as no direct contact between the bearing and moving surfaces, high rigidity, minimum vibration, high resistance to the movements, no metal-to-metal contact and friction, and adjustable contact interface, etc.

In this embodiment, the normal directions N1-N3 of the first bearing surface 410, second bearing surface 420, and third bearing surface 430 of the guide rails 40 each have an angle θ of approximately 45 degrees from the X-axis, but the disclosure is not limited thereto.

In addition, in this or some other embodiments, defining a reference line R passing through the two guide rails 40 and not parallel to the normal directions N1-N3 of the first bearing surface 410, second bearing surface 420, and third bearing surface 430 of the guide rails 40. The said reference line R is an imaginary line that passes through the centroids (not shown) of the two guide rails 40 or passes through the closest, the farthest edges or the respective features of the two guide rails 40, but the disclosure is not limited thereto. Also, in this embodiment, the reference line R may be substantially parallel to the X-axis but is not parallel to the arrangement direction D of the movers 330, stators 320, and stator holder 310 of the linear motor 30. As long as the reference line R of the guide rails 40 is not parallel to the normal directions of the guide rails 40 and the arrangement direction of the linear motor, the absolute locations and orientations of the guide rails 40 are not particularly restricted. Further, the arrangement direction D of the linear motor 30 is not parallel to the normal directions N1-N3 of the first bearing surface 410, second bearing surface 420, and third bearing surface 430 of the guide rails 40.

Accordingly, the normal directions N1-N3 of the first bearing surface 410, second bearing surface 420, and third bearing surface 430 of the guide rails 40 are not parallel to the X-axis, Y-axis, and Z-axis, the reference line R of the guide rails 40, and the arrangement direction D of the linear motor 30.

In short, in this or some other embodiments, the guide rails 40 and the linear motor 30 are all placed in an inclined manner compared with the basic coordinate system of the machine tool 1 (i.e., the coordinate system consisted of the aforementioned X-axis, Y-axis, and Z-axis), and the guide rails 40 are also inclined with respect to the linear motor 30. However, the inclination of the guide rails 40 to the basic coordinate system of the machine tool 1 may be the same as or different from that of the linear motor 30 to the basic coordinate system of the machine tool 1; for example, in this embodiment or other embodiments, the arrangement direction D of the linear motor 30 may also have an angle of approximately 45 degrees from the X-axis, but the disclosure is not limited thereto.

Furthermore, in this or some other embodiments, as it can be seen from the figures, the two guide rails 40 are placed in a mirror symmetry manner relative to the Z-axis, wherein their inclinations are opposite, and they are substantially arranged along the X-axis. This configuration helps to balance the hydrostatic force exerted on the guide rails 40 so as to reduce the deformation of the machine tool 1 caused by the hydrostatic pressure.

Then, please refer to FIG. 3 and further refer to FIG. 4, FIG. 4 is an enlarged view of FIG. 2 when the machine tool 1 is in operation and applies hydrostatic pressure on the guide rails 40. As shown in the figures, when the machine tool 1 is in operation and oil or lubricating fluid is fed into the guide rail accommodation chambers 21, the bearing oil films L are formed and the hydrostatic force F is applied on the guide rails 40 so as to increase the gaps between the guide rails 40 and the movable main structure 20. Since the guide rails 40 are arranged in an inclined manner, the hydrostatic force F applied on the first bearing surface 410, the second bearing surface 420, and the third bearing surface 430 of the movable main structure 20 is not parallel to the X-axis, Y-axis, and Z-axis. Therefore, each of these hydrostatic pressures F have components directed along the basic axes of the machine tool 1 (i.e., the X-axis, Y-axis, and Z-axis), which helps to reduce or eliminate the twisting movement of the movable main structure 20 with respect to the machine base 10, thereby improving the dynamic characteristics of the machine tool 1 during the operation.

In short, because the normal directions N1-N3 of the first bearing surface 410, second bearing surface 420, and third bearing surface 430 of the guide rails 40 are not parallel to the X-axis, Y-axis, and Z-axis, and the reference line R passing through the guide rails 40, each of the forces applied on the surfaces of the guide rails 40 is not only exerted along a single axis but has components exerted along plural axes at the same time. This improves the rigidity in the X-axis to avoid or eliminate the problem, that the movable main structure 20 of the machine tool 1 may be twisted during operation, thereby improving the machining precision.

Also, since the movers 330 are fixed on the arm portions 520 of the connecting structure 50, the unnecessary deformation or disturbance of the movable main structure 20 caused by the linear motor 30 can be effectively reduced.

In addition, the guide rail installation recesses 11 for accommodating the guide rails 40 and the lower motor installation recess 12 for accommodating the linear motor 30 are all V-shaped grooves and thus having high structural strength in geometry, which helps to prevent the machine base 10 from being deformed by the hydrostatic force F applied on the guide rails 400.

Figure 5:
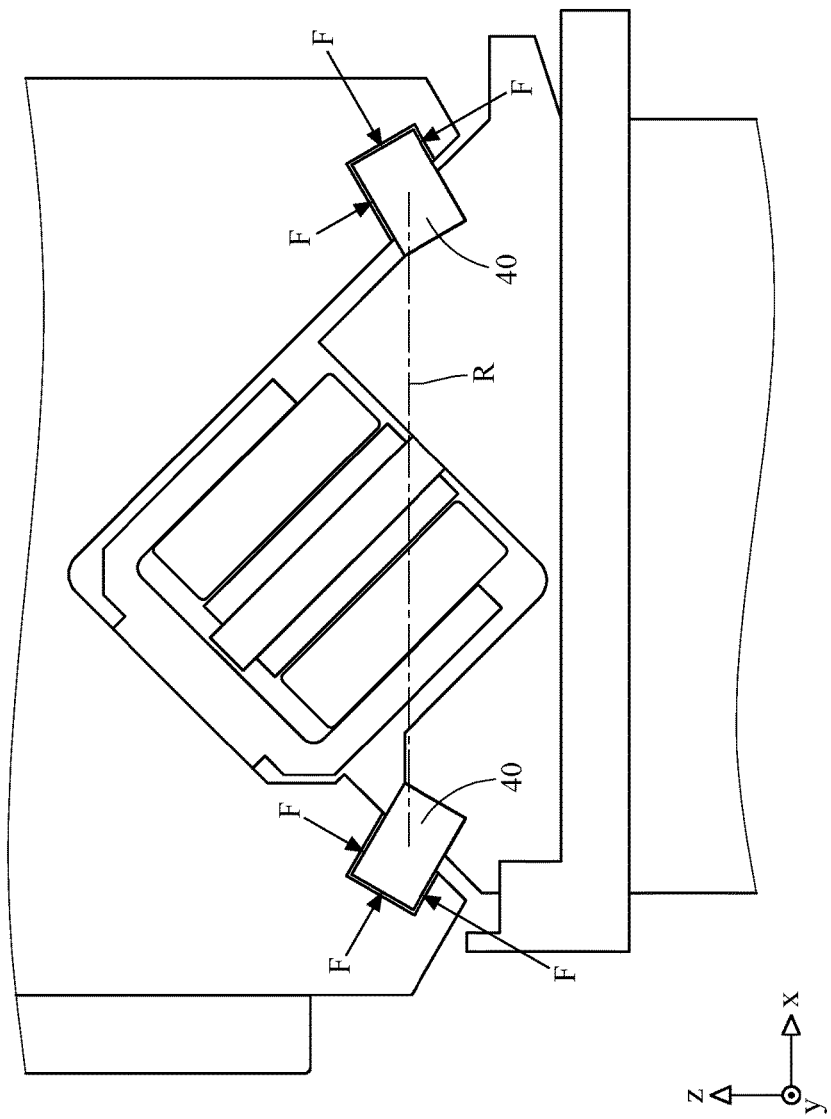
FIG. 5 is a partial enlarged side view of a machine tool according to another embodiment of the disclosure.
Figure 6:
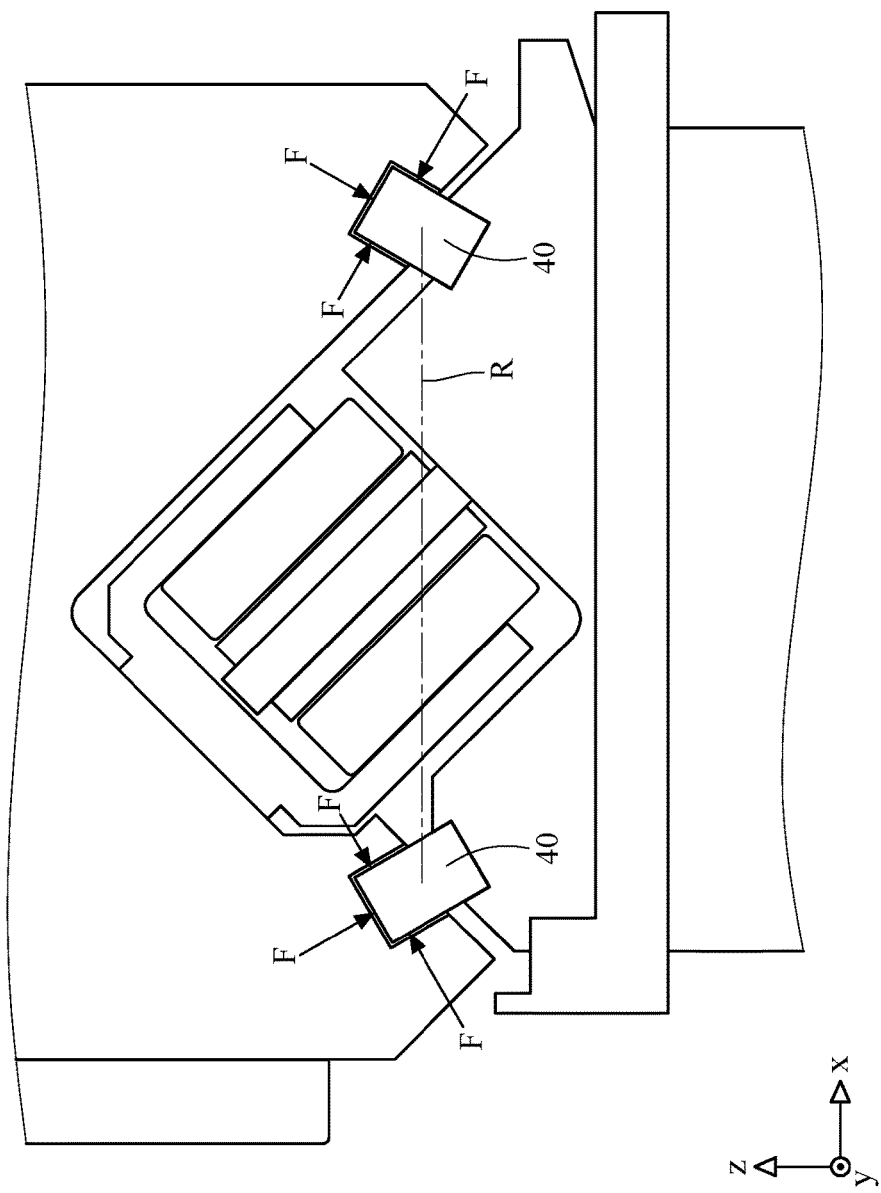
FIG. 6 is a partial enlarged side view of a machine tool according to yet another embodiment of the disclosure.

Note that any configuration, that the normal directions of the bearing surfaces of the guide rails are not parallel to the basic axes of the machine tool and the reference line that passes through the guide rails, should belong to the scope of the disclosure. For examples, please refer to FIGS. 5 and 6, FIG. 5 is a partial enlarged side view of a machine tool 2 according to another embodiment of the disclosure, and FIG. 6 is a partial enlarged side view of a machine tool 3 according to yet another embodiment of the disclosure. The main difference between the embodiments in FIGS. 5-6 and the previous embodiments is the inclination of the guide rails 40. In FIG. 5, the guide rails 40 are still placed in an inclined manner but more inclined compared to that of the previous embodiment; in FIG. 6, the guide rails 40 are still placed in an inclined manner but less inclined compared to the previous embodiment. Similarly, in the embodiments of FIGS. 5-6, the hydrostatic force applied on the bearing surfaces of the guide rails 40 is not parallel to the basic axes of the coordinate system of the machine tool (i.e., the X-axis, Y-axis, and Z-axis shown in the figures) and the reference line R passing through the guide rails 40. Therefore, the machine tools 2-3 are also able to prevent the twisting movement of the movable main structure during the operation. It is understood that the inclination of the guide rails 40 may be adjusted according to the actual requirements, and the disclosure is not limited thereto.

In addition, in the previous embodiments, the stator holder 310 and guide rails 40 are fixed on the machine base 10, but the disclosure is not limited thereto. For example, in some other embodiments, the stator holder 310 and guide rails 40 may be fixed on the movable main structure 20, and the locations of the adjacent components may be changed according to this adjustment.

According to the machine tool discussed above, since the normal directions of the bearing surfaces of the guide rails are not parallel to the X-axis, Y-axis, and Z-axis of the machine tool, and the reference line that passes through the guide rails, that is, the hydrostatic force is not only exerted along one axis but has components along the X-axis, Y-axis, and Z-axis of the machine tool, which helps to improve the rigidity in, for example, the X-axis to avoid or eliminate the problem, that the movable main structure may be twisted during the operation, thereby improving the machining precision.

In addition, since the movers are fixed on the arm portions of the connecting structure, the unnecessary deformation or disturbance of the movable main structure caused by the linear motor can be effectively reduced.

Further, the guide rail installation recesses for accommodating the guide rails and the lower motor installation recess for accommodating the linear motor are all V-shaped grooves and thus having high structural strength in geometry, which helps to prevent the machine base from being deformed by the hydrostatic force applied on the guide rails.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A machine tool, comprising a machine base, two guide rails and a movable main structure, the movable main structure slidably disposed on the machine base via the two guide rails, each of the two guide rails having a plurality of bearing surfaces facing and configured to guide the movable main structure, the machine tool having an X-axis, a Y-axis and a Z-axis perpendicular to one another, the Z-axis substantially parallel to an axis of a chuck of the machine tool, and the Y-axis substantially parallel to a sliding direction of the movable main structure with respect to the machine base;
   wherein normal directions of the plurality of bearing surfaces of the two guide rails are not parallel to the X-axis, the Y-axis, the Z-axis of the machine tool, and a reference line that passes through the two guide rails.

2. The machine tool according to claim 1, wherein the machine base has two guide rail installation recesses, the two guide rails are respectively disposed in the two guide rail installation recesses, and each of the two guide rail installation recesses is a V-shaped groove.

3. The machine tool according to claim 1, wherein the normal directions of the plurality of bearing surfaces of the two guide rails each have an angle of approximately 45 degrees from the X-axis.

4. The machine tool according to claim 1, further comprising a linear motor disposed between the machine base and the movable main structure, the two guide rails are respectively located at two opposite sides of the linear motor, the linear motor is configured to drive the movable main structure to slide with respect to the machine base along the Y-axis.

5. The machine tool according to claim 4, wherein the machine base has a lower motor installation recess, the movable main structure has an upper motor installation recess, a portion of the linear motor is accommodated in the lower motor installation recess, another portion of the linear motor is accommodated in the upper motor installation recess, and the lower motor installation recess and the upper motor installation recess are V-shaped grooves.

6. The machine tool according to claim 4, further comprising a connecting structure, the connecting structure having a fixed portion and two arm portions, wherein the fixed portion is fixed on the movable main structure, the two arm portions are respectively connected to two opposite ends of the fixed portion and are spaced apart from the movable main structure and the machine base, the linear motor comprises two movers, two stators and a stator holder, the stator holder is fixed on the machine base, the two movers are respectively fixed on the two arm portions of the connecting structure, and the two stators are respectively fixed on two opposite sides of the stator holder and are located between the two movers.

7. The machine tool according to claim 4, wherein the linear motor comprises two movers, two stators and a stator holder, the stator holder is fixed on the machine base, the two movers are fixed to the movable main structure, the two stators are respectively fixed on two opposite sides of the stator holder and are located between the two movers, wherein the two movers, the two stators and the stator holder are arranged along an arrangement direction which is not parallel to the X-axis, the Y-axis, and the Z-axis of the machine tool.

8. The machine tool according to claim 4, wherein the linear motor comprises two movers, two stators and a stator holder, the stator holder is fixed on the machine base, the two movers are fixed to the movable main structure, the two stators are respectively fixed on two opposite sides of the stator holder and are located between the two movers, wherein the two movers, the two stators and the stator holder are arranged along an arrangement direction which is not parallel to the reference line that passes through the two guide rails.

9. The machine tool according to claim 4, wherein the linear motor comprises two movers, two stators and a stator holder, the stator holder is fixed on the machine base, the two movers are fixed to the movable main structure, the two stators are respectively fixed on two opposite sides of the stator holder and are located between the two movers, wherein the two movers, the two stators and the stator holder are arranged along an arrangement direction which is not parallel to the normal directions of the plurality of bearing surfaces of the two guide rails.

10. The machine tool according to claim 4, wherein the two guide rails and the linear motor are substantially arranged along the X-axis.

* * * * *